United States Patent
Pendharkar

(10) Patent No.: US 9,367,457 B1
(45) Date of Patent: Jun. 14, 2016

(54) SYSTEMS AND METHODS FOR ENABLING WRITE-BACK CACHING AND REPLICATION AT DIFFERENT ABSTRACTION LAYERS

(71) Applicant: Symantec Corporation, Mountain View, CA (US)

(72) Inventor: Niranjan Pendharkar, Pune (IN)

(73) Assignee: Veritas Technologies, LLC, Mountain View, CA (US)

( * ) Notice: Subject to any disclaimer, the term of this patent is extended or adjusted under 35 U.S.C. 154(b) by 217 days.

(21) Appl. No.: 13/720,871

(22) Filed: Dec. 19, 2012

(51) Int. Cl.
*G06F 12/08* (2006.01)

(52) U.S. Cl.
CPC ........ *G06F 12/0815* (2013.01); *G06F 12/0891* (2013.01)

(58) Field of Classification Search
CPC ...................................................... G06F 12/00
See application file for complete search history.

(56) References Cited

U.S. PATENT DOCUMENTS

| | | | |
|---|---|---|---|
| 7,636,814 B1 | 12/2009 | Karr et al. | |
| 8,612,681 B2* | 12/2013 | Saito et al. | 711/114 |
| 2003/0212865 A1 | 11/2003 | Hicken et al. | |
| 2006/0200638 A1* | 9/2006 | Galipeau et al. | 711/162 |
| 2010/0077165 A1 | 3/2010 | Lu et al. | |
| 2013/0339569 A1 | 12/2013 | Yochai et al. | |
| 2014/0059298 A1* | 2/2014 | Olin et al. | 711/135 |

OTHER PUBLICATIONS

Anindya Banerjee; Systems and Methods for Enabling Write-Back-Cache Aware Snapshot Creation; U.S. Appl. No. 13/743,904, filed Jan. 17, 2013.

* cited by examiner

*Primary Examiner* — Ryan Bertram
*Assistant Examiner* — Tracy Chan
(74) *Attorney, Agent, or Firm* — ALG Intellectual Property, LLC

(57) ABSTRACT

A computer-implemented method for enabling write-back caching and replication at different abstraction layers may include (1) identifying a cache abstraction layer that implements write-back caching to selectively cache at least one write to a backing store, (2) identifying a replication abstraction layer that replicates the backing store to a secondary storage system by replicating writes committed to the backing store to the secondary storage system, (3) receiving a request to create a point-in-time image of the backing store at the secondary storage system at a point at which the writes committed to the backing store are point-in-time consistent, (4) committing the cached write to the backing store to ensure that the writes committed to the backing store are point-in-time consistent, (5) marking the point at which the writes committed to the backing store are point-in-time consistent. Various other methods, systems, and computer-readable media are also disclosed.

20 Claims, 24 Drawing Sheets

SYSTEMS AND METHODS FOR ENABLING WRITE-BACK CACHING AND REPLICATION AT DIFFERENT ABSTRACTION LAYERS

BACKGROUND

In the digital age, organizations increasingly rely on digitally stored data. To protect against data loss, organizations may use replication technologies to replicate data from a primary storage device to a secondary storage device from which the data may be backed up and later restored. To improve storage system performance, organizations may use caching technologies to cache reads from and/or writes to a relatively slow primary storage device in faster cache memory.

Unfortunately, attempting to (1) protect against data loss and (2) improve storage system performance by combining common replication solutions with common caching solutions may be problematic because certain caching technologies may cause the data stored within a storage device to be point-in-time inconsistent. For example, a typical caching solution may implement a write-back policy to cache writes to a storage device. While implementing write-back caching, the caching solution may selectively store some of the writes destined for the storage device to cache memory instead of to the storage device. By selectively storing writes to cache memory instead of to the storage device, the caching solution may cause the data within the storage device to be point-in-time inconsistent. If a replication solution then replicates this inconsistent data to a secondary storage device, the data within the secondary storage device may also be point-in-time inconsistent. For this reason, any backup of the storage device that is created from the data within the secondary storage device may also be point-in-time inconsistent and potentially unusable. Accordingly, the instant disclosure addresses a need for additional and improved systems and methods for enabling write-back caching and replication at different abstraction layers.

SUMMARY

As will be described in greater detail below, the instant disclosure generally relates to systems and methods for enabling write-back caching and replication at different abstraction layers. In one example, a computer-implemented method for enabling write-back caching and replication at different abstraction layers may include (1) identifying a cache abstraction layer that implements write-back caching to selectively cache at least one write to a backing store, (2) identifying a replication abstraction layer that replicates the backing store to a secondary storage system by replicating writes committed to the backing store to the secondary storage system, (3) receiving a request to create a point-in-time image of the backing store at the secondary storage system at a point at which the writes committed to the backing store are point-in-time consistent, (4) committing, in response to the request, the cached write to the backing store to ensure that the writes committed to the backing store are point-in-time consistent, and (5) marking, upon committing the cached write to the backing store, the point at which the writes committed to the backing store are point-in-time consistent so that the point-in-time image of the backing store can be created at the point at which the writes committed to the backing store are point-in-time consistent.

In some embodiments, the step of committing the cached write to the backing store may include (1) flushing the cached write to the backing store and (2) caching subsequent writes to the backing store at the cache abstraction layer while the cached write is flushed to the backing store. The cached subsequent writes may not be committed to the backing store until the cached write is flushed to the backing store.

In certain embodiments, the step of committing the cached write to the backing store may include (1) flushing the cached write to the backing store and (2) implementing write-through caching at the cache abstraction layer to cache subsequent writes to the backing store while the cached write is flushed to the backing store.

In at least one embodiment, the step of marking the point at which the writes committed to the backing store are point-in-time consistent may include (1) writing a marker to the backing store at the point at which the writes committed to the backing store are point-in-time consistent and (2) replicating the marker to the secondary storage system.

In other embodiments, the step of marking the point at which the writes committed to the backing store are point-in-time consistent may include (1) sending a message to the replication abstraction layer that indicates that the writes committed to the backing store are point-in-time consistent and (2) relaying the message to the secondary storage system.

In certain embodiments, the method may further include (1) determining, at the secondary storage system, the point at which the writes committed to the backing store are point-in-time consistent and (2) creating the point-in-time image of the backing store based on the determination.

In various embodiments, the cache abstraction layer may include a volume manager and/or a file system manager, and the replication abstraction layer may include an intelligent storage array and/or a volume manager.

In one embodiment, a system for implementing the above-described method may include (1) an identification module programmed to identify a cache abstraction layer that implements write-back caching to selectively cache at least one write to a backing store and a replication abstraction layer that replicates the backing store to a secondary storage system by replicating writes committed to the backing store to the secondary storage system, (2) a receiving module programmed to receive a request to create a point-in-time image of the backing store at the secondary storage system at a point at which the writes committed to the backing store are point-in-time consistent, (3) a committing module programmed to commit, in response to the request, the cached write to the backing store to ensure that the writes committed to the backing store are point-in-time consistent, (4) a marking module programmed to mark, upon committing the cached write to the backing store, the point at which the writes committed to the backing store are point-in-time consistent so that the point-in-time image of the backing store can be created at the point at which the writes committed to the backing store are point-in-time consistent, and (5) at least one processor configured to execute the identification module, the receiving module, the committing module, and the marking module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a cache abstraction layer that implements write-back caching to selectively cache at least one write to a backing store, (2) identify a replication abstraction layer that replicates the backing store to a secondary storage system by replicating writes committed to the backing store to the secondary storage system, (3) receive a request to create a point-in-time image of the backing store at the secondary storage system at a point at which the writes committed to the backing store are point-in-time consistent, (4) commit, in response to the request, the cached write to the backing store to ensure that the writes committed to the backing store are point-in-time consistent, and (5) mark, upon committing the cached write to the backing store, the point at which the writes committed to the backing store are point-in-time consistent so that the point-in-time image of the backing store can be created at the point at which the writes committed to the backing store are point-in-time consistent.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
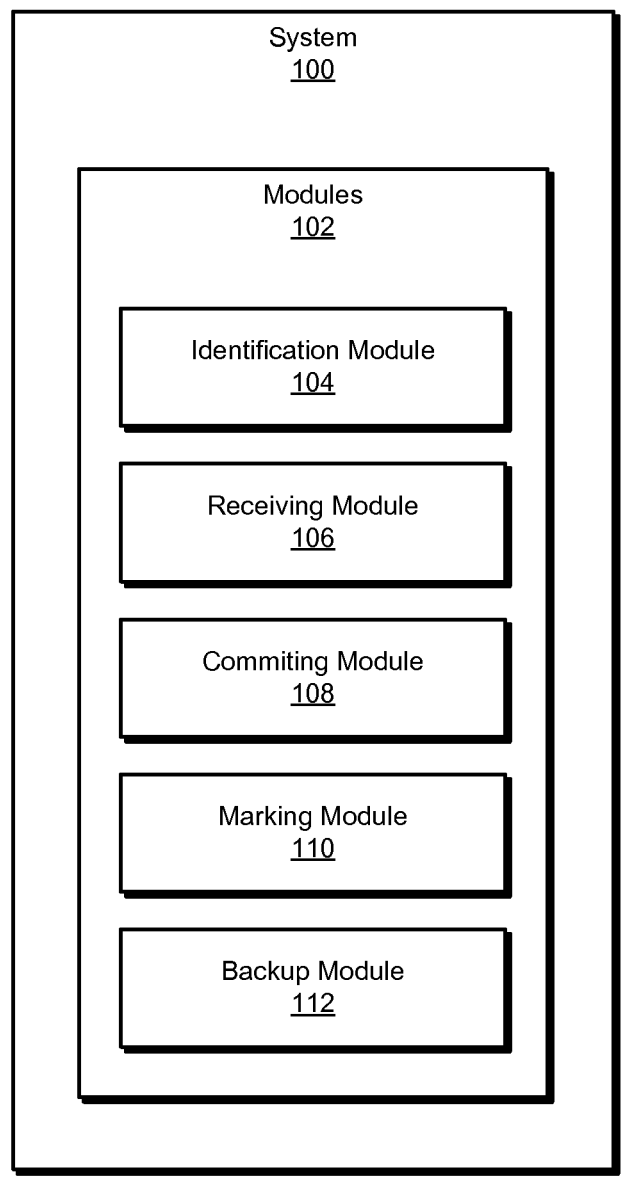
FIG. 1 is a block diagram of an exemplary system for enabling write-back caching and replication at different abstraction layers.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for enabling write-back caching and replication at different abstraction layers. As will be explained in greater detail below, by periodically flushing, to a backing store, writes destined for the backing store that have been cached by a cache abstraction layer that implements write-back caching, the systems and methods described herein may ensure that the data within the backing store is periodically point-in-time consistent. Furthermore, in some examples, by ensuring that the data within the backing store is periodically point-in-time consistent, these systems and methods may ensure that, when the data within the backing store is replicated to a secondary storage system by an independent replication abstraction layer, the replicated data is also periodically point-in-time consistent.

Moreover, by marking the point at which the data within the backing store is point-in-time consistent and replicating this marker to the secondary storage system, these systems and methods may enable the creation of a point-in-time image of the backing store at the secondary storage system at a point at which the data within the backing store is point-in-time consistent.

Figure 2:
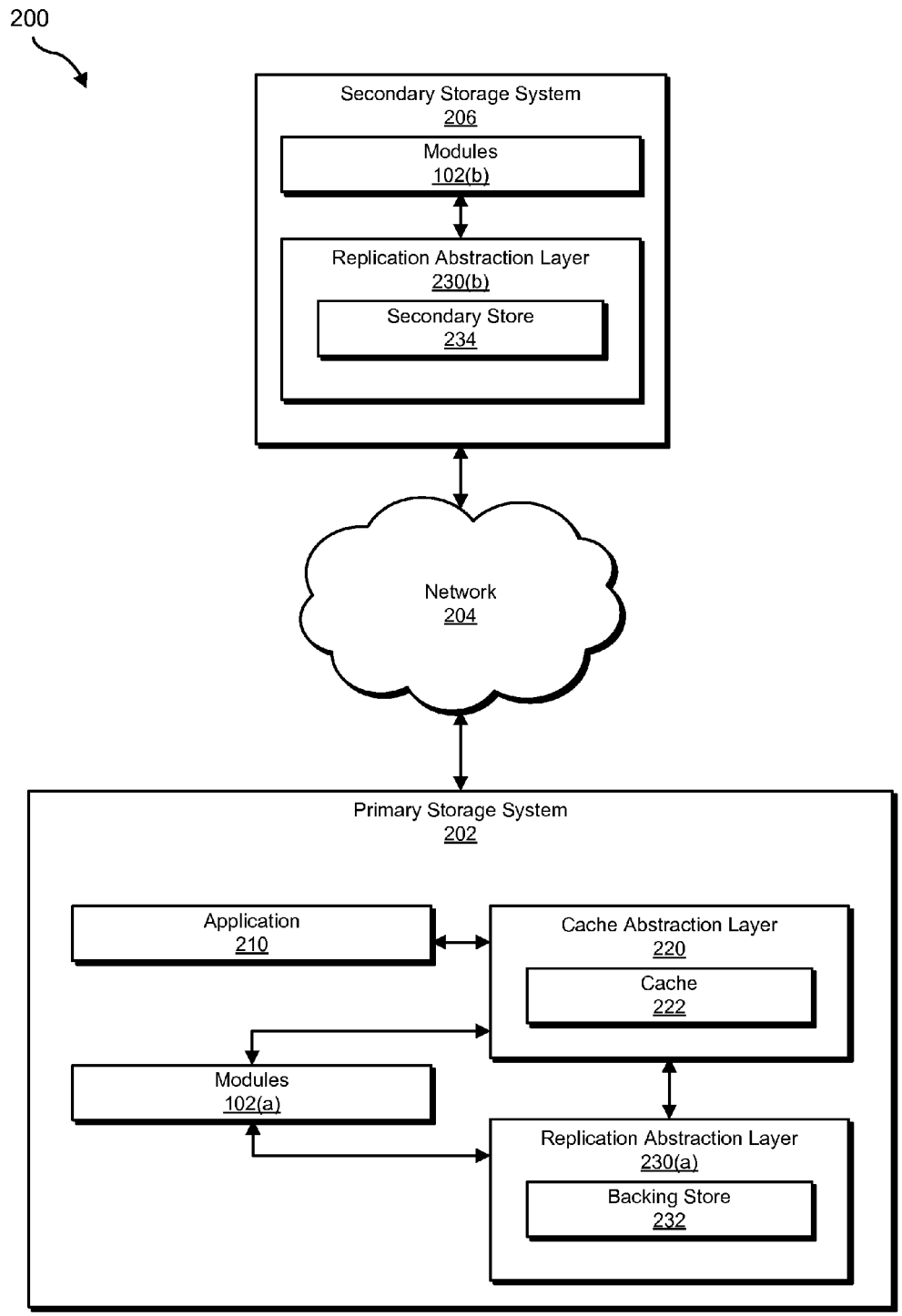
FIG. 2 is a block diagram of an exemplary system for enabling write-back caching and replication at different abstraction layers.

The following will provide, with reference to FIGS. 1-2, detailed descriptions of exemplary systems for enabling write-back caching and replication at different abstraction layers. Detailed descriptions of corresponding computer-implemented methods will also be provided in connection with FIGS. 3-22. In addition, detailed descriptions of an exemplary computing system and network architecture capable of implementing one or more of the embodiments described herein will be provided in connection with FIGS. 23 and 24, respectively.

FIG. 1 is a block diagram of an exemplary system 100 for enabling write-back caching and replication at different abstraction layers. As illustrated in this figure, exemplary system 100 may include one or more modules 102 for performing one or more tasks. For example, and as will be explained in greater detail below, exemplary system 100 may include an identification module 104 programmed to identify a cache abstraction layer that implements write-back caching to selectively cache at least one write to a backing store and a replication abstraction layer that replicates the backing store to a secondary storage system by replicating writes committed to the backing store to the secondary storage system. Exemplary system 100 may also include a receiving module 106 programmed to receive a request to create a point-in-time image of the backing store at the secondary storage system at a point at which the writes committed to the backing store are point-in-time consistent.

In addition, and as will be described in greater detail below, exemplary system 100 may include a committing module 108 programmed to commit, in response to the request, the cached write to the backing store to ensure that the writes committed to the backing store are point-in-time consistent. Exemplary system 100 may also include a marking module 110 programmed to mark, upon committing the cached write to the backing store, the point at which the writes committed to the backing store are point-in-time consistent so that the point-in-time image of the backing store can be created at the point at which the writes committed to the backing store are point-in-time consistent. Exemplary system 100 may further include a backup module 112 programmed to create the point-in-time image of the backing store.

Although illustrated as separate elements, one or more of modules 102 in FIG. 1 may represent portions of a single module or application. For example, one or more of modules 102 in FIG. 1 may represent portions of a single module or application that is used to manage a system that includes a cache abstraction layer that implements write-back caching to cache writes to a backing store and a replication abstraction layer that replicates the backing store to a secondary storage system. Additionally and/or alternatively, one or more of modules 102 in FIG. 1 may represent portions of a cache abstraction layer and/or a replication abstraction layer. As part of the cache abstraction layer and/or the replication abstraction layer, one or more of modules 102 in FIG. 1 may enable the cache abstraction layer to coordinate with the replication abstraction layer so that a point-in-time image of a backing store may be created at a secondary storage system.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., primary storage system 202 and/or secondary storage system 206), computing system 2310 in FIG. 23, and/or portions of exemplary network architecture 2400 in FIG. 24. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a primary storage system 202 in communication with a secondary storage system 206 via a network 204. Primary storage system 202 may be programmed with one or more of modules 102. Additionally or alternatively, secondary storage system 206 may be programmed with one or more of modules 102.

In one embodiment, one or more of modules 102 from FIG. 1 may, when executed by at least one processor of primary storage system 202 and/or secondary storage system 206, facilitate primary storage system 202 and/or secondary storage system 206 in enabling write-back caching and replication at different abstraction layers. For example, and as will be described in greater detail below, one or more of modules 102 may cause primary storage system 202 and/or secondary storage system 206 to (1) identify a cache abstraction layer 220 that implements write-back caching to selectively cache (e.g., to cache 222) at least one write to a backing store 232, (2) identify a replication abstraction layer 230 that replicates backing store 232 to secondary storage system 206 by replicating writes committed to backing store 232 to secondary store 234, (3) receive a request to create a point-in-time image of backing store 232 at secondary storage system 206 at a point at which the writes committed to backing store 232 are point-in-time consistent, (4) commit, in response to the request, the cached write to backing store 232 to ensure that the writes committed to backing store 232 are point-in-time consistent, and (5) mark the point at which the writes committed to backing store 232 are point-in-time consistent so that the point-in-time image of backing store 232 can be created.

Primary storage system 202 and secondary storage system 206 may include any type or form of computing device capable of reading computer-executable instructions and storing data. Examples of primary storage system 202 and secondary storage system 206 include, without limitation, laptops, tablets, desktops, servers, cellular phones, Personal Digital Assistants (PDAs), multimedia players, embedded systems, combinations of one or more of the same, exemplary computing system 2310 in FIG. 23, or any other suitable computing device.

As shown in FIG. 2, primary storage system 202 may include cache 222 and backing store 232, and secondary storage system 206 may include secondary store 234. Cache 222, backing store 232, and secondary store 234 may generally represent any type or form of volatile or non-volatile storage device or medium capable of storing data. For example, cache 222, backing store 232, and secondary store 234 may represent one or more of the storage mediums and/or storage devices illustrated in FIG. 23 (e.g., system memory 2316, storage device 2332, and/or storage device 2333) and/or one or more of the storage mediums and/or storage devices illustrated in FIG. 24 (e.g., storage devices 2460(1)-(N), storage devices 2470(1)-(N), storage devices 2490(1)-(N), and/or intelligent storage array 2495).

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 2400 in FIG. 24, or the like. Network 204 may facilitate communication or data transfer using wireless or wired connections. In one embodiment, network 204 may facilitate communication between primary storage system 202 and secondary storage system 206.

Figure 3:
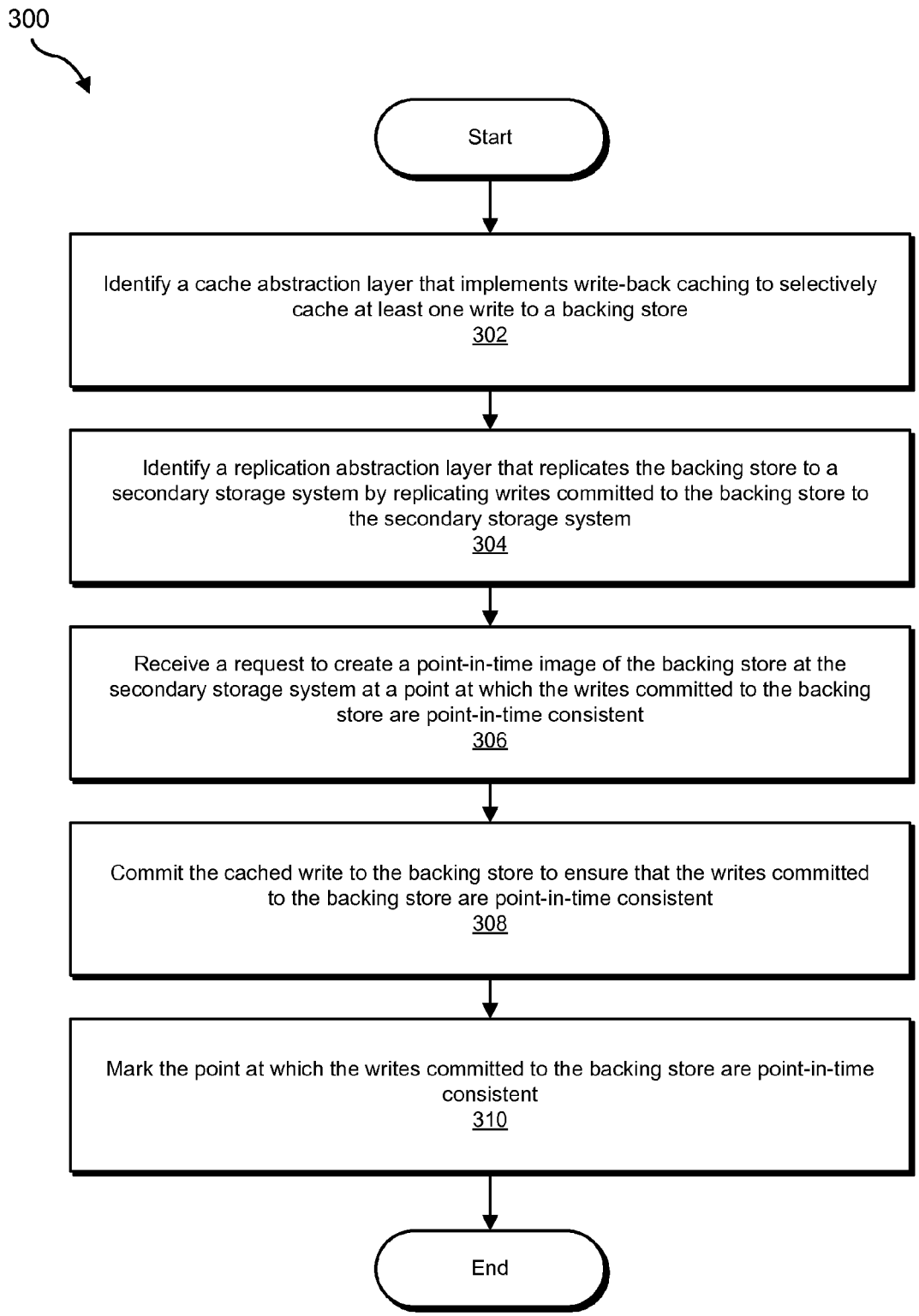
FIG. 3 is a flow diagram of an exemplary method for enabling write-back caching and replication at different abstraction layers.

FIG. 3 is a flow diagram of an exemplary computer-implemented method 300 for enabling write-back caching and replication at different abstraction layers. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 2310 in FIG. 23, and/or portions of exemplary network architecture 2400 in FIG. 24.

As illustrated in FIG. 3, at step 302 one or more of the systems described herein may identify a cache abstraction layer that implements write-back caching to selectively cache at least one write to a backing store. For example, at step 302 identification module 104 may, as part of primary storage system 202 in FIG. 2, identify cache abstraction layer 220. At step 304, one or more of the systems described herein may also identify a replication abstraction layer that replicates the backing store to a secondary storage system by replicating writes committed to the backing store to the secondary storage system. For example, at step 304 identification module 104 may, as part of primary storage system 202 in FIG. 2, identify replication abstraction layer 230.

As used herein, the term "cache abstraction layer" may generally refer to any system (e.g., any combination of software and/or hardware) that is capable of caching data destined for a backing store. In some examples, the term "cache abstraction layer" may refer to a system that implements caching for one or more applications without requiring the applications to be aware of and/or handle any caching operations (e.g., allowing the applications to perform I/O operations normally as if no caching were implemented). Examples of cache abstraction layers may include, without limitations, file system managers (e.g., VERITAS FILE SYSTEM) and/or volume managers (e.g., VERITAS VOLUME MANAGER). The term "backing store", as used herein, may generally refer to any type or form of storage device or medium capable of storing data. In some examples, the term "backing store" may refer to a storage device or medium to which one or more applications may write data. In some examples, the term "backing store" may refer to a storage device for which a caching system implements caching. Examples of backing stores may include, without limitation, file systems, volumes, and/or storage arrays.

Cache abstraction layers may cache data destined for a backing store using various writing policies. For example, cache abstraction layer 220 may implement write-back caching to cache writes destined for backing store 232. Using a write-back policy, cache abstraction layer 220 may (1) receive, from an application (e.g., application 210), a request to write data to backing store 232 and (2) selectively store a portion of the data to cache 222 but not to backing store 232. Later, before overwriting data stored to cache 222, cache abstraction layer 220 may flush the data to backing store 232. By selectively storing data to cache 222 but not to backing store 232, cache abstraction layer 220 may cause data within backing store 232 to be, at times, point-in-time inconsistent.

Figure 4:
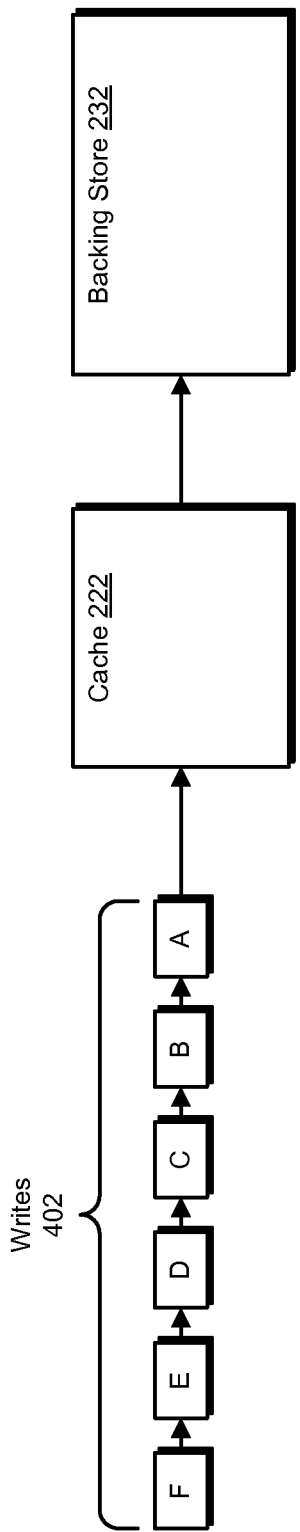
FIG. 4 is a flow diagram of an exemplary data flow for caching data.
Figure 5:
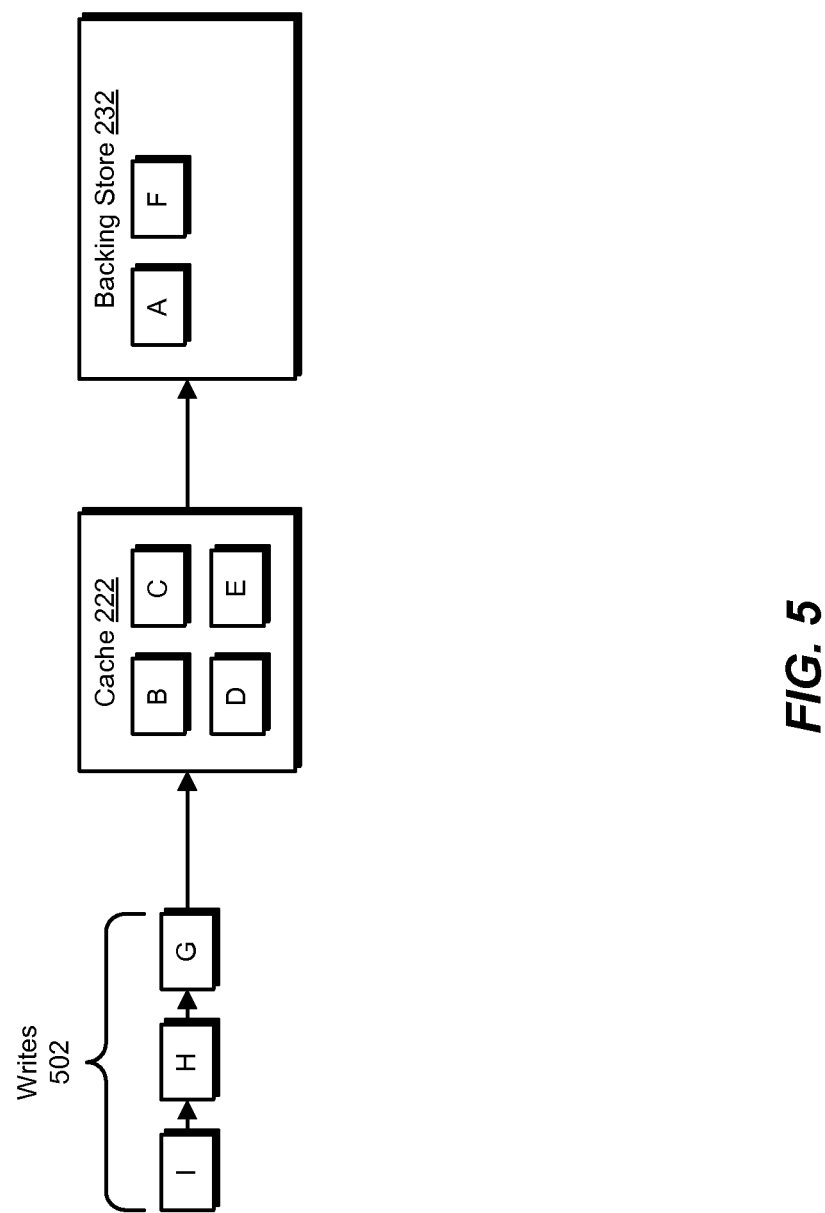
FIG. 5 is a flow diagram of an exemplary data flow for caching data.
Figure 6:
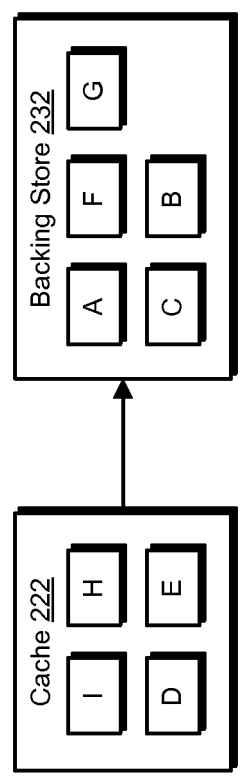
FIG. 6 is a flow diagram of an exemplary data flow for caching data.

FIGS. 4-6 illustrate how cache abstraction layer 220 in FIG. 2 may, while implementing write-back caching, cache a series of writes destined for backing store 232 in a way that causes data within backing store 232 to be point-in-time inconsistent. As shown in FIG. 4, cache abstraction layer 220 may receive a request, from application 210, to store a series of writes 402 to backing store 232. Writes 402 may include a series of ordered writes A, B, C, D, E, and F (e.g., cache abstraction layer 220 may have received a request to store write A to backing store 232, followed by a request to store write B to backing store 232, etc.). In response to this request, cache abstraction layer 220 may, again while implementing write-back caching, selectively store some of writes 402 to cache 222 but not to backing store 232 and may store the rest of writes 402 to backing store 232 but not to cache 222. For example as shown in FIG. 5, cache abstraction layer 220 may store writes B, C, D, and E to cache 222 and writes A and F to backing store 232. Because cache abstraction layer 220 stored some of writes 402 to cache 222 and others to backing store 232, data within backing store 232 may be point-in-time inconsistent.

Cache abstraction layer 220 may continue to receive requests to write data to backing store 232. For example as shown in FIG. 5, cache abstraction layer 220 may receive a request to store an additional series of writes 502 to backing store 232. Writes 502 may include a series of ordered writes G, H, and I. In response to this request, cache abstraction layer 220 may, again while implementing write-back caching, selectively store some of writes 502 to cache 222 but not to backing store 232 and may store the rest of writes 502 to backing store 232 but not to cache 222. For example as shown in FIG. 6, cache abstraction layer 220 may store writes H and I to cache 222 and write G to backing store 232. In this example, cache abstraction layer 220 may flush writes C and B from cache 222 to backing store 232 to make room for writes H and I. Because cache abstraction layer 220 stored some of writes 402 and 502 to cache 222 and others to backing store 232, data within backing store 232 may be point-in-time inconsistent.

Returning to FIG. 3, the term "replication abstraction layer" may generally refer to any system (e.g., any combination of software and/or hardware) that is capable of replicating data. Examples of replication abstraction layers may include, without limitations, volume managers and/or intelligent storage arrays. In some examples, a replication abstraction layer may be used to create a point-in-time image of a backing store at a secondary storage system (e.g., for the purpose of backing up the data within the backing store).

Figure 7:
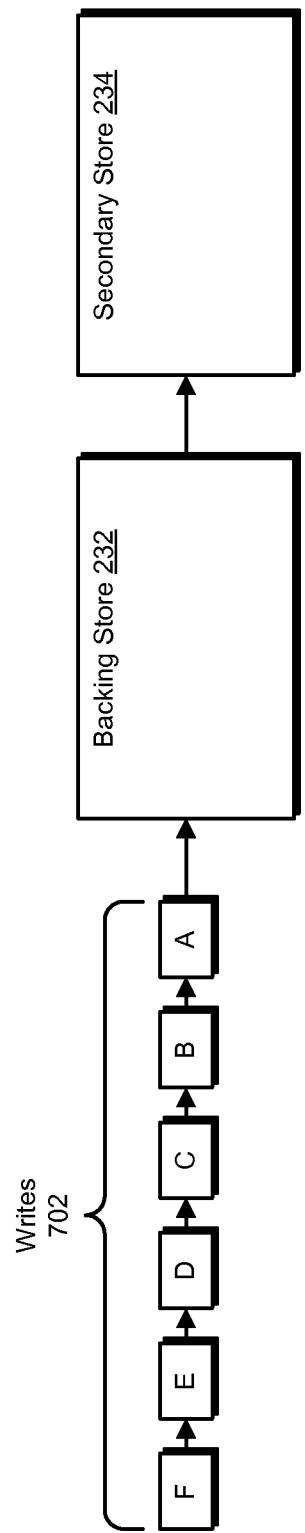
FIG. 7 is a flow diagram of an exemplary data flow for replicating data.
Figure 8:
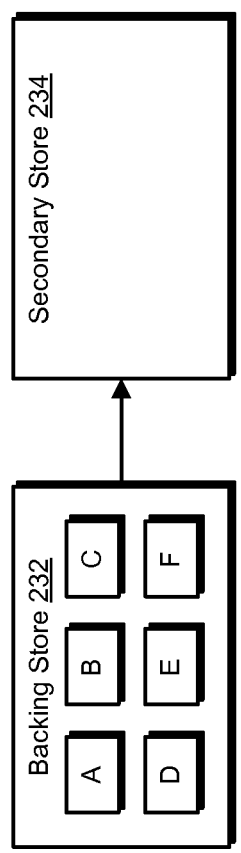
FIG. 8 is a flow diagram of an exemplary data flow for replicating data.
Figure 9:
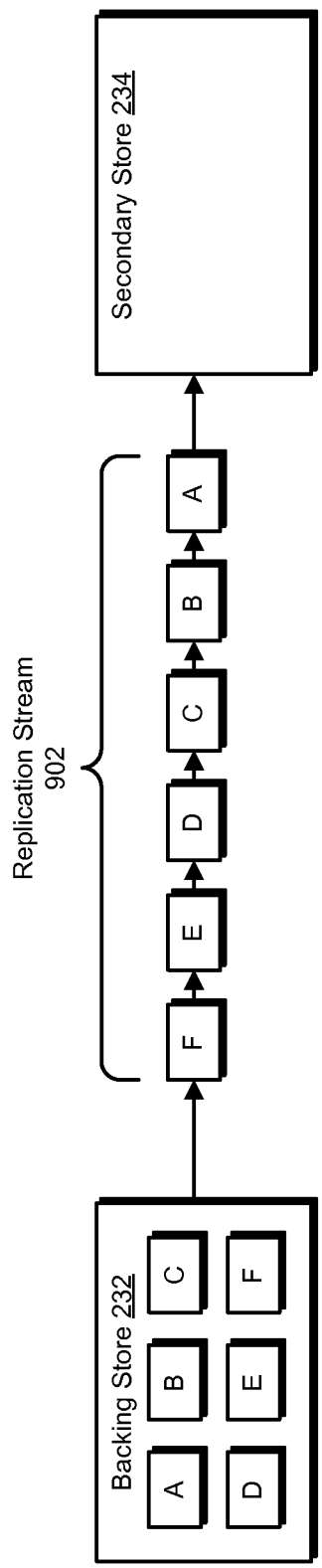
FIG. 9 is a flow diagram of an exemplary data flow for replicating data.
Figure 10:
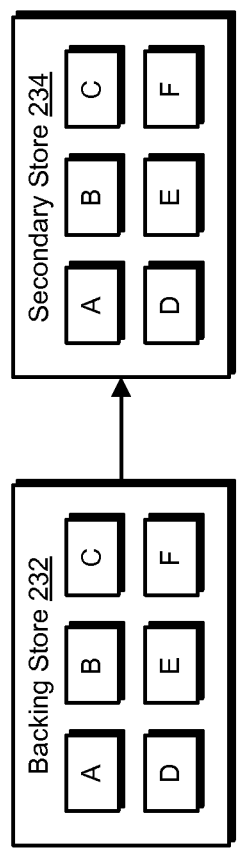
FIG. 10 is a flow diagram of an exemplary data flow for replicating data.

Replication abstraction layers may replicate data using various methods. For example, replication abstraction layer 230 may implement synchronous or asynchronous block-level replication to replicate backing store 232 to secondary storage system 206. FIGS. 7-10 illustrate how replication abstraction layer 230 may replicate backing store 232 to secondary storage system 206. As shown in FIG. 7, a series of writes 702 may be written (e.g., by cache abstraction layer 220) to backing store 232. Writes 702 may include a series of ordered writes A, B, C, D, E, and F (e.g., cache abstraction layer 220 may have first committed write A to backing store 232, followed by write B, etc.). In one example, replication abstraction layer 230 may detect that writes 702 have been committed to backing store 232 (as shown in FIG. 8) and may replicate writes 702 to secondary store 234 either synchronously or asynchronously. For example, as shown in FIG. 9, replication abstraction layer 230 may asynchronously transmit writes 702 to secondary store 234 via replication stream 902. At secondary storage system 206, replication abstraction layer 230 may commit each write within replication stream 902 to secondary store 234 in the order that the write was committed to backing store 232. By committing each write within replication stream 902 to secondary store 234 in the order that the write was committed to backing store 232, replication abstraction layer 230 may maintain a copy of the data within backing store 232 at secondary storage system 206 (e.g., as shown in FIG. 10).

Returning to FIG. 3, the systems described herein may perform steps 302 and 304 in any suitable manner. For example, identification module 104 may represent a portion of a system used to manage cache abstraction layers and replication abstraction layers. In one example, identification module 104 may identify cache abstraction layer 220 and replication abstraction layer 230 by detecting that cache abstraction layer 220 caches writes destined for the same backing store that replication abstraction layer 230 is replicating to secondary storage system 206. Additionally and/or alternatively, identification module 104 may identify cache abstraction layer 220 and replication abstraction layer 230 by reading a configuration file identifying cache abstraction layer 220 and replication abstraction layer 230.

In another example, identification module 104 may represent a portion of cache abstraction layer 220 and may identify replication abstraction layer 230 by determining that replication abstraction layer 230 is configured to replicate backing store 232. In other examples, identification module 104 may represent a portion of replication abstraction layer 230 and may identify cache abstraction layer 220 by determining that cache abstraction layer 220 is configured to cache writes destined for backing store 232.

At step 306, one or more of the systems described herein may receive a request to create a point-in-time image of the backing store at the secondary storage system at a point at which the writes committed to the backing store are point-in-time consistent. For example, at step 306 receiving module 106 may, as part of primary storage system 202 in FIG. 2, receive a request to create a point-in-time image of backing store 232 at secondary storage system 206 at a point at which the writes committed to backing store 232 are point-in-time consistent.

As used herein, the term "point-in-time image" may refer to any point-in-time consistent copy of a backing store that is created at a point at which the writes committed to the backing store are point-in-time consistent. Writes committed to a backing store may be considered point-in-time consistent if all writes destined for the backing store prior to a specific point-in-time have been committed to the backing store. On the other hand, writes committed to a backing store may be considered point-in-time inconsistent if all writes destined for the backing store prior to a specific point-in-time have not been committed to the backing store.

The systems described herein may perform step 306 in any suitable manner. In one example, replication abstraction layer 230 may be configured to create point-in-time images of backing store 232 at secondary storage system 206, and receiving module 106 may, as part of replication abstraction layer 230, receive the request to create the point-in-time image of backing store 232 from a storage system administrator. In another example, replication abstraction layer 230 may, prior to creating point-in-time images of backing store 232, request that cache abstraction layer 220 flush cached outstanding writes to backing store 232 to ensure that the writes committed to backing store 232 are point-in-time consistent, and receiving module 106 may, as part of cache abstraction layer 220, receive this request.

Figure 11:
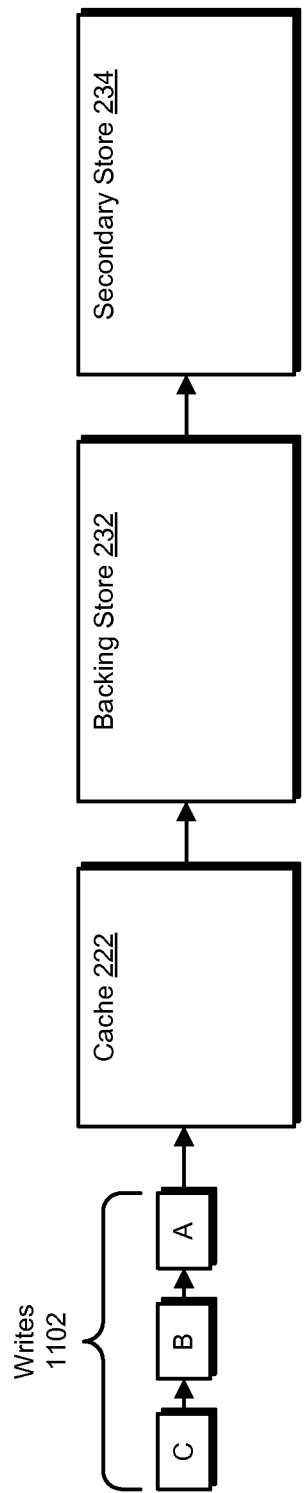
FIG. 11 is a flow diagram of an exemplary data flow for enabling write-back caching and replication at different abstraction layers.
Figure 12:
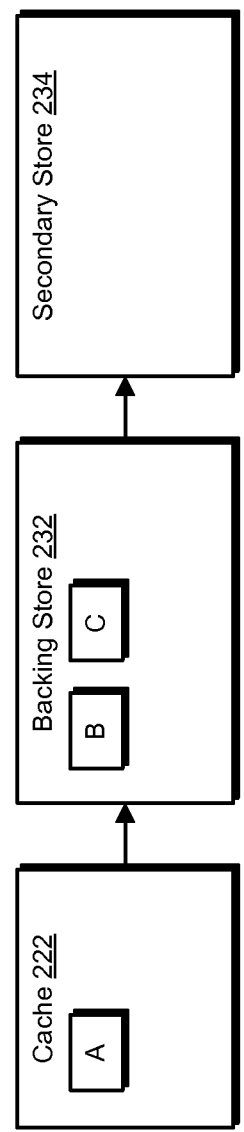
FIG. 12 is a flow diagram of an exemplary data flow for enabling write-back caching and replication at different abstraction layers.

FIGS. 11-14 illustrate how cache abstraction layer 220 and replication abstraction layer 230 may store data to cache 222, backing store 232, and secondary store 234 before receiving module 106 receives the request to create the point-in-time image of backing store 232. As shown in FIG. 11, cache abstraction layer 220 may receive a request (e.g., from application 210) to store a series of writes 1102 to backing store 232. Writes 1102 may include a series of ordered writes A, B, and C. In response to this request, cache abstraction layer 220 may, while implementing write-back caching, selectively store some of writes 1102 to cache 222 but not to backing store 232 and the rest of writes 1102 to backing store 232 but not to cache 222. For example as shown in FIG. 12, cache abstraction layer 220 may store write A to cache 222 and writes B and C to backing store 232. Because cache abstraction layer 220 stored some of writes 1102 to cache 222 and others to backing store 232, backing store 232 may not be point-in-time consistent.

Figure 13:
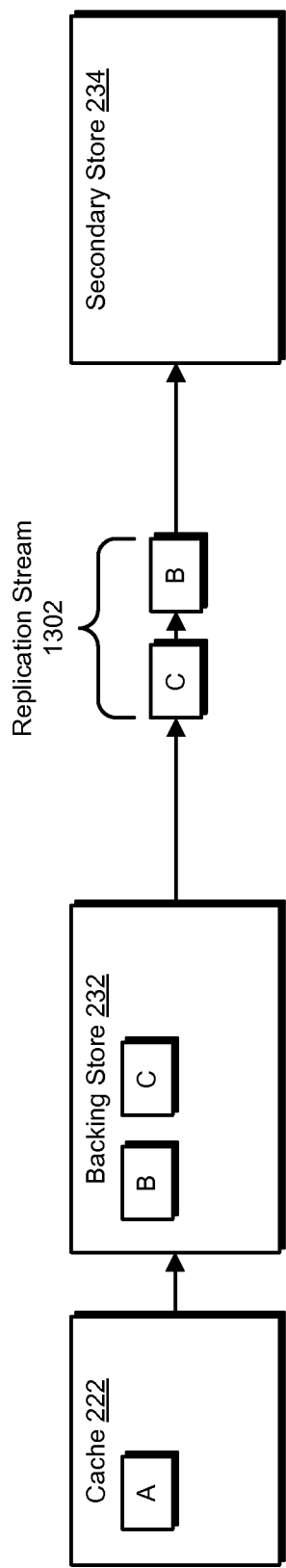
FIG. 13 is a flow diagram of an exemplary data flow for enabling write-back caching and replication at different abstraction layers.
Figure 14:
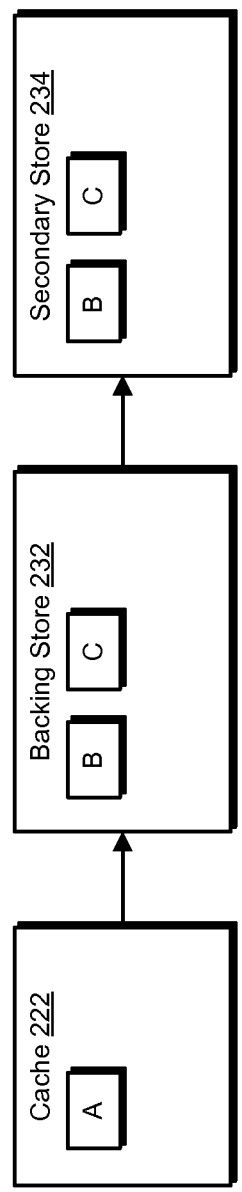
FIG. 14 is a flow diagram of an exemplary data flow for enabling write-back caching and replication at different abstraction layers.

Replication abstraction layer 230 may detect that writes B and C have been committed to backing store 232 (as shown in FIG. 13) and may replicate these writes to secondary store 234. For example, replication abstraction layer 230 may asynchronously transmit writes B and C to secondary store 234 via replication stream 1302 and may commit each write within replication stream 1302 to secondary store 234 in the order that the write was committed to backing store 232. By committing each write within replication stream 1302 to secondary store 234 in the order that the write was committed to backing store 232, replication abstraction layer 230 may maintain a copy of backing store 232 on secondary store 234 (e.g., as shown in FIG. 14). But because the data stored to backing store 232 is point-in-time inconsistent, as a result of cache abstraction layer 220 having stored some of writes 1102 to cache 222, secondary store 234 may also be point-in-time inconsistent. For this reason, the portion of writes 1102 held in cache 222 may need to be flushed to backing store 232 and then replicated to secondary store 234 before a point-in-time image of backing store 232 may be created from the data within secondary store 234.

Returning to FIG. 3 at step 308, one or more of the systems described herein may commit the cached write to the backing store to ensure that the writes committed to the backing store are point-in-time consistent. For example, at step 308 committing module 108 may, as part of primary storage system 202 in FIG. 2, commit outstanding writes stored within cache 222 to backing store 232 to ensure that the writes committed to backing store 232 are point-in-time consistent. At step 310, one or more of the systems described herein may then mark the point at which the writes committed to the backing store are point-in-time consistent so that the point-in-time image of the backing store can be created at the point at which the writes committed to the backing store are point-in-time consistent. For example, at step 310 marking module 110 may, as part of primary storage system 202 in FIG. 2, mark the point at which the writes committed to backing store 232 are point-in-time consistent so that a point-in-time image of backing store 232 can be created.

The systems described herein may perform steps 308 and 310 in any suitable manner. In one example, committing module 108 may commit outstanding writes stored to cache 222 to backing store 232 in a way that ensures that the writes committed to backing store 232 are point-in-time consistent by storing subsequent writes destined for backing store 232 in cache 222 until after the writes that were previously stored to cache 222 have been flushed to backing store 232. After the previously cached writes are flushed to backing store 232 but before any of the subsequent writes are allowed to be committed to backing store 232, marking module 110 may mark backing store 232 as point-in-time consistent.

In addition to and/or as an alternative to storing subsequent writes to cache 222, committing module 108 may commit outstanding writes stored to cache 222 to backing store 232 in a way that ensures that the writes committed to backing store 232 are point-in-time consistent by causing cache abstraction layer 220 to implement write-through caching until after all outstanding writes have been flushed to backing store 232. While implementing write-through caching, cache abstraction layer 220 may still store subsequent writes to cache 222, but when cache abstraction layer 220 stores a subsequent write to cache 222 it may also commit the subsequent write to backing store 232. By storing subsequent writes to both cache 222 and backing store 232, cache abstraction layer 220 may ensure that the data within backing store 232 is point-in-time consistent at the moment when all outstanding writes have been flushed from cache 222 to backing store 232. After the outstanding writes are flushed to backing store 232 but before cache abstraction layer 220 is allowed to again implement write-back caching, marking module 110 may mark backing store 232 as point-in-time consistent.

Marking module 110 may mark backing store 232 as point-in-time consistent in a variety of ways. In one example, marking module 110 may, as part of cache abstraction layer 220, write a marker (e.g., a file marker) to backing store 232 at the point at which the writes committed to backing store 232 are point-in-time consistent. For example, marking module 110 may write a marker to backing store 232 immediately after committing module 108 has flushed all previously outstanding writes from cache 222 to backing store 232. In one example, replication abstraction layer 230 may be configured to interpret the marker as an indication of the point at which the writes committed to backing store 232 are point-in-time consistent. In at least one example, marking module 110 may, as part of replication abstraction layer 230, replicate the marker to secondary storage system 206.

By replicating the marker to secondary storage system 206, marking module 110 may provide backup module 112 with a point at which a point-in-time image of backing store 232 may be created at secondary storage system 206. In at least one example, backup module 112 may create a point-in-time image of backing store 232 at a point at which the writes committed to backing store 232 are point-in-time consistent by (1) detecting when the replicated marker is received at secondary storage system 206 and (2) creating the point-in-time image of backing store 232 based on the replicated marker. The point-in-time image may be stored at secondary storage system 206 at least until backup module 112 has created an additional point-in-time image of backing store 232 in response to detecting a subsequent marker. In one example, backup module 112 may maintain one or more point-in-time images of backing store 232 at secondary storage system 206 according to a predetermined recovery point objective. In another example, backup module 112 may delete an older point-in-time image of backing store 232 once a newer point-in-time image of backing store 232 is created.

Additionally and/or alternatively, marking module 110 may mark the point at which the writes committed to backing store 232 are point-in-time consistent by sending a message to replication abstraction layer 230 that indicates that the writes committed to backing store 232 are point-in-time consistent. In one example, marking module 110 may send a message that indicates the point at which the writes committed to backing store 232 are point-in-time consistent to replication abstraction layer 230 via a special application programming interface (API). In at least one example, marking module 110 may, as part of replication abstraction layer 230, relay this message to secondary storage system 206.

By relaying this message to secondary storage system 206, marking module 110 may provide backup module 112 with a point at which a point-in-time image of backing store 232 may be created at secondary storage system 206. In at least one example, backup module 112 may create a point-in-time image of backing store 232 at a point at which the writes committed to backing store 232 are point-in-time consistent by (1) detecting when the message is received at secondary storage system 206 and (2) creating the point-in-time image of backing store 232 based on the received message. This point-in-time image may be stored at secondary storage system 206 at least until after backup module 112 has created an additional point-in-time image of backing store 232 in response to detecting a subsequent message. In one example, backup module 112 may maintain one or more point-in-time images of backing store 232 at secondary storage system 206 according to a predetermined recovery point objective. In another example, backup module 112 may delete an older point-in-time image of backing store 232 once a newer point-in-time image of backing store 232 is created.

Point-in-time images of backing store 232 may be used in a variety of ways. For example, one or more of the systems described herein may use a point-in-time image of backing store 232 as a secondary or backup source of the data within backing store 232. In one example, backup module 112 may enable an administrator to select a point-in-time image of backing store 232 from which to restore data (e.g., data that has been inadvertently deleted from backing store 232 or data that has been corrupted) to backing store 232. In another example, backup module 112 may enable an administrator to select a point-in-time image of backing store 232 from which an application (e.g., application 210) may access the data within backing store 232 in the event that backing store 232 becomes unavailable. In some examples, backup module 112 may select a most recent point-in-time image of backing store 232 from which to restore data. Upon completion of step 310, exemplary method 300 in FIG. 3 may terminate.

Figure 15:
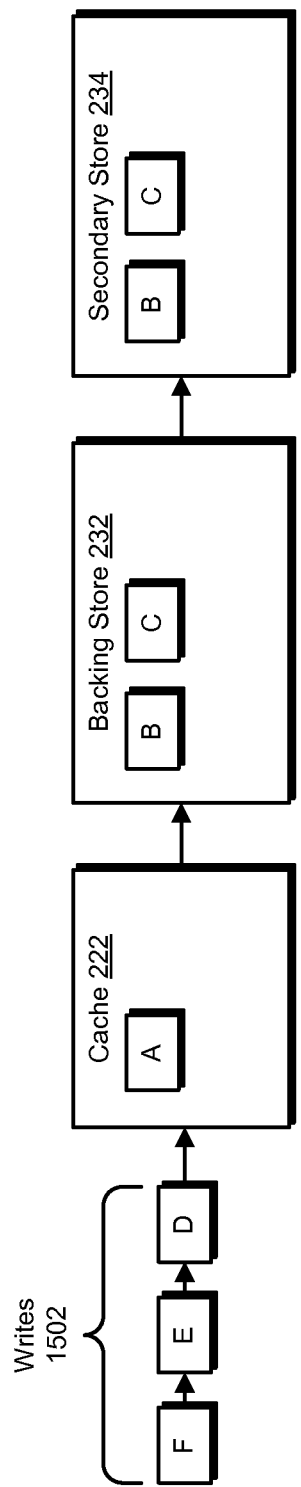
FIG. 15 is a flow diagram of an exemplary data flow for enabling write-back caching and replication at different abstraction layers.
Figure 16:
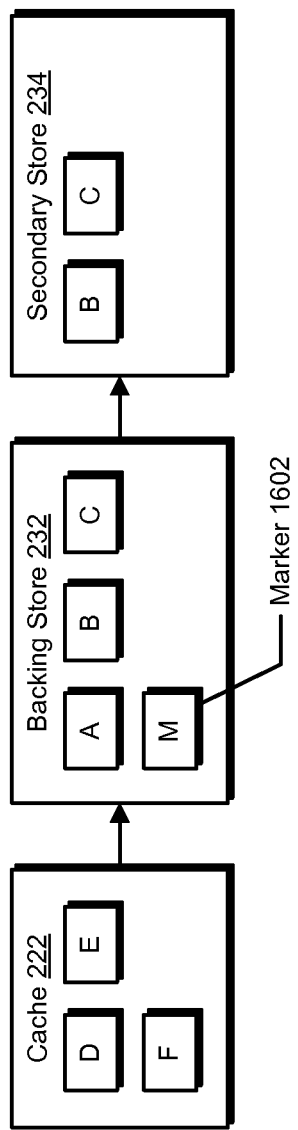
FIG. 16 is a flow diagram of an exemplary data flow for enabling write-back caching and replication at different abstraction layers.

FIGS. 15-18 illustrate an example of how one or more of the systems described herein may, in response to a request to create a point-in-time image of backing store 232 at secondary storage system 206, flush writes stored in cache 222 to backing store 232 and mark backing store 232 as point-in-time consistent. As shown in FIG. 15, cache abstraction layer 220 may receive a request to store a series of subsequent writes 1502 to backing store 232 at a point in time after writes 1102 have been stored to cache 222, backing store 232, and secondary store 234 (e.g., as illustrated in FIG. 14). Writes 1502 may include a series of ordered writes D, E, and F. As shown in FIG. 16, committing module 108 may store subsequent writes 1502 to cache 222 while flushing previously outstanding writes (e.g., write A) from cache 222 to backing store 232. Once committing module 108 has flushed the previously outstanding writes, marking module 110 may mark backing store 232 as point-in-time consistent by writing a file marker 1602 to backing store 232 (e.g., as shown in FIG. 16).

Figure 17:
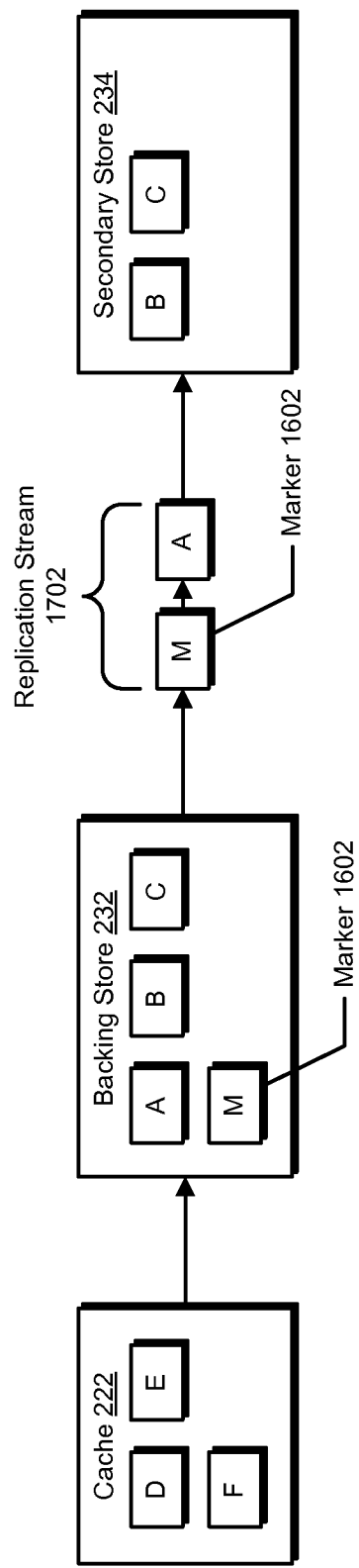
FIG. 17 is a flow diagram of an exemplary data flow for enabling write-back caching and replication at different abstraction layers.

Replication abstraction layer 230 may detect that write A and marker 1602 have been committed to backing store 232 and may replicate these writes to secondary store 234. For example as shown in FIG. 17, replication abstraction layer 230 may transmit write A and marker 1602 to secondary store 234 via replication stream 1702 and may commit write A and file marker 1602 to secondary store 234 in the order that each write was committed to backing store 232 (e.g., as shown in FIG. 18).

Figure 18:
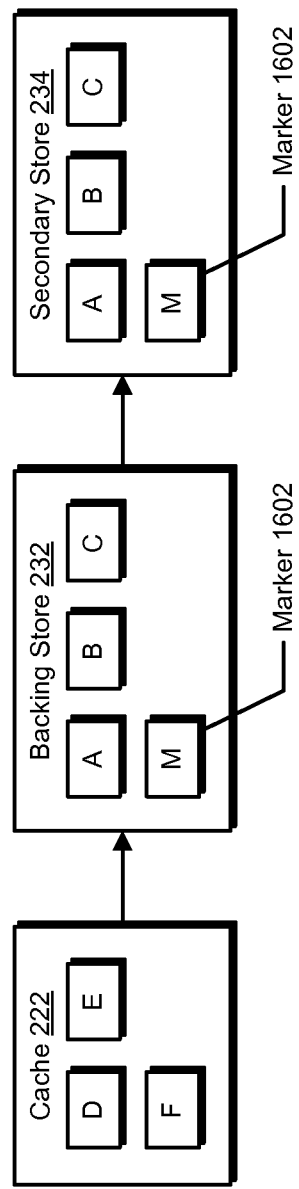
FIG. 18 is a flow diagram of an exemplary data flow for enabling write-back caching and replication at different abstraction layers.

As shown in FIG. 18 at the moment marker 1602 is committed to secondary store 234, the data stored within secondary store 234 may represent a copy of the data within backing store 232 at a point at which the writes committed to backing store 232 are point-in-time consistent. In at least one example, backup module 112 may detect that marker 1602 has been committed to secondary store 234 and may, in response to the detection, create a point-in-time image of backing store 232 using the replicated data within secondary store 234.

Figure 19:
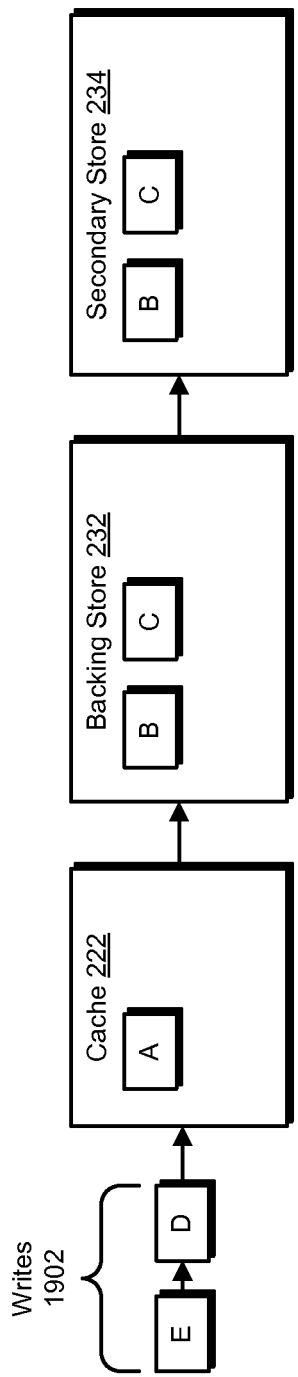
FIG. 19 is a flow diagram of an exemplary data flow for enabling write-back caching and replication at different abstraction layers.
Figure 20:
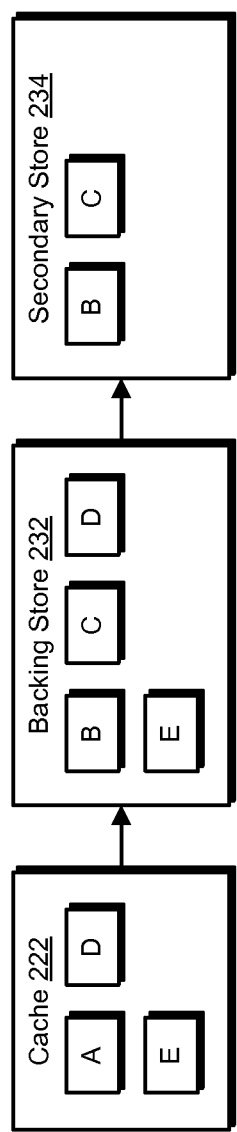
FIG. 20 is a flow diagram of an exemplary data flow for enabling write-back caching and replication at different abstraction layers.
Figure 21:
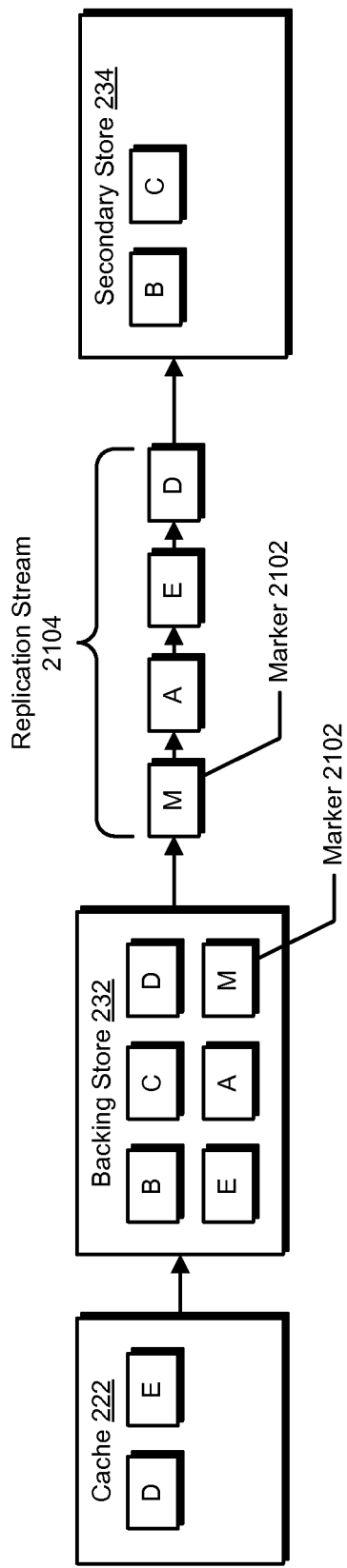
FIG. 21 is a flow diagram of an exemplary data flow for enabling write-back caching and replication at different abstraction layers.
Figure 22:
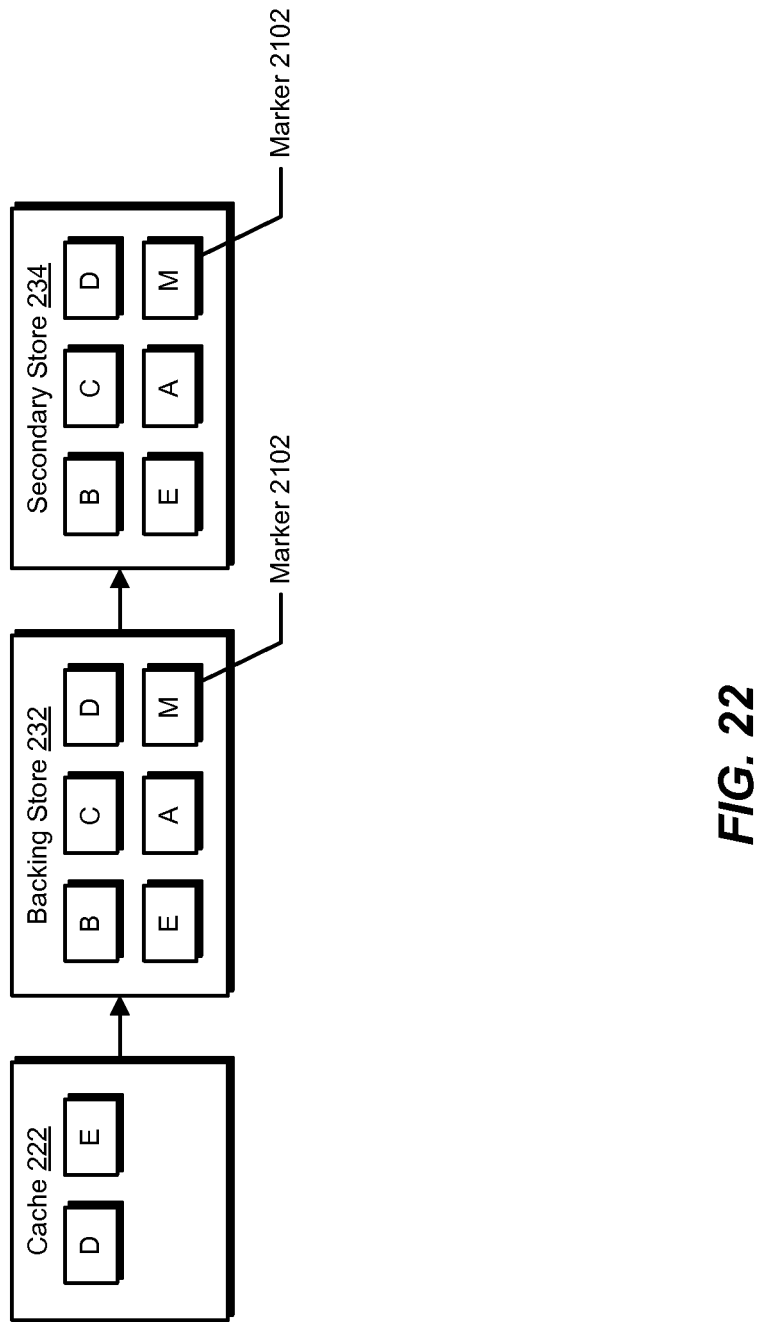
FIG. 22 is a flow diagram of an exemplary data flow for enabling write-back caching and replication at different abstraction layers.

FIGS. 19-22 illustrate another example of how one or more of the systems described herein may, in response to a request to create a point-in-time image of backing store 232 at secondary storage system 206, flush outstanding writes stored in cache 222 to backing store 232 and mark backing store 232 as point-in-time consistent. As shown in FIG. 19, cache abstraction layer 220 may receive a request to store a series of subsequent writes 1902 to backing store 232 at a point in time after writes 1102 have been stored to cache 222, backing store 232, and secondary store 234 (e.g., as illustrated in FIG. 14). Writes 1902 may include a series of ordered writes D and E. Committing module 108 may cause cache abstraction layer 220 to implement write-through caching to store writes 1902 to cache 222 and backing store 232 while flushing outstanding cached writes (e.g., write A) from cache 222 to backing store 232. (e.g., as shown in FIG. 20). Once committing module 108 has flushed the previously outstanding writes to backing store 232, marking module 110 may mark backing store 232 as point-in-time consistent by writing a file marker 2102 to backing store 232 (e.g., as shown in FIG. 21).

Replication abstraction layer 230 may detect that writes 1902, write A, and file marker 2102 have been committed to backing store 232 and may replicate these writes to secondary store 234. For example as shown in FIG. 21, marking module 110 may transmit writes 1902, write A, and file marker 2102 to secondary store 234 via replication stream 2104 and may commit each write within replication stream 2104 to secondary store 234 in the order that the write was committed to backing store 232

As shown in FIG. 21 at the moment marker 2102 is committed to secondary store 234, the data stored within secondary store 234 may represent a copy of the data within backing store 232 at a point at which the writes committed to backing store 232 are point-in-time consistent. In at least one example, backup module 112 may detect that marker 2102 has been committed to secondary store 234 and may, in response to the detection, create a point-in-time image of backing store 232 using the replicated data within secondary store 234.

As explained above, by periodically flushing, to a backing store, writes destined for the backing store that have been cached by a cache abstraction layer that implements write-back caching, the systems and methods described herein may ensure that the data within the backing store is periodically point-in-time consistent. Furthermore, in some examples, by ensuring that the data within the backing store is periodically point-in-time consistent, these systems and methods may ensure that, when the data within the backing store is replicated to a secondary storage system by an independent replication abstraction layer, the replicated data is also periodically point-in-time consistent.

Moreover, by marking the point at which the data within the backing store is point-in-time consistent and replicating this marker to the secondary storage system, these systems and methods may enable the creation of a point-in-time image of the backing store at the secondary storage system at a point at which the data within the backing store is point-in-time consistent.

For example, the systems and methods described herein may enable a replication solution to continuously replicate a backing store to a secondary storage system even as a caching solution implements write-back caching to selectively cache writes destined for the backing store by (1) periodically committing writes cached by the caching solution to the backing store and (2) marking the backing store as point-in-time consistent after the writes have been committed. By marking the backing store as point-in-time consistent, these systems and methods may also enable the replication solution to create a point-in-time image of the backing store at the secondary storage system.

Figure 23:
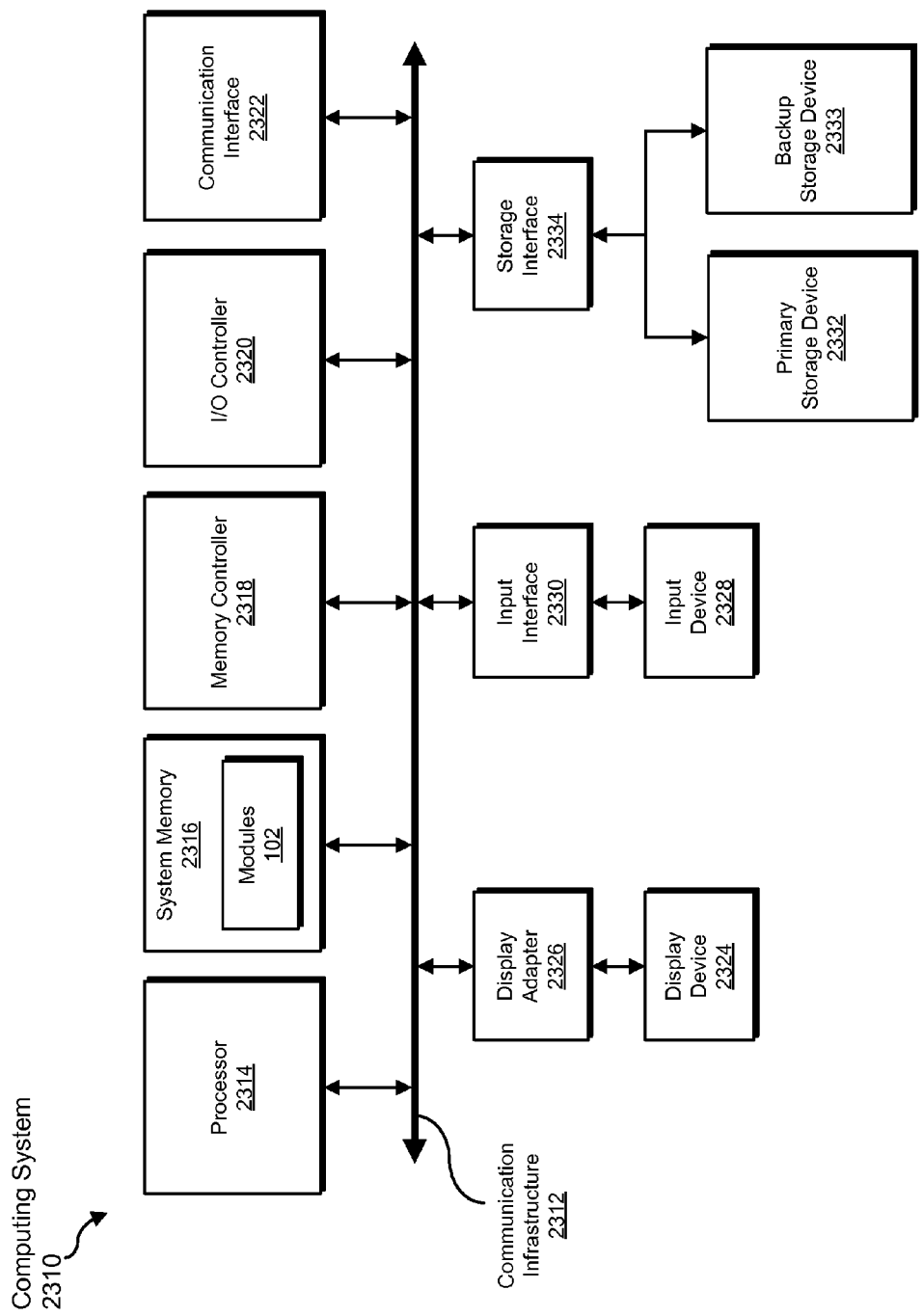
FIG. 23 is a block diagram of an exemplary computing system capable of implementing one or more of the embodiments described and/or illustrated herein.

FIG. 23 is a block diagram of an exemplary computing system 2310 capable of implementing one or more of the embodiments described and/or illustrated herein. For example, all or a portion of computing system 2310 may perform and/or be a means for performing, either alone or in combination with other elements, one or more of the identifying, receiving, committing, marking, flushing, caching, implementing, writing, replicating, sending, relaying, determining, creating steps described herein. All or a portion of computing system 2310 may also perform and/or be a means for performing any other steps, methods, or processes described and/or illustrated herein.

Computing system 2310 broadly represents any single or multi-processor computing device or system capable of executing computer-readable instructions. Examples of computing system 2310 include, without limitation, workstations, laptops, client-side terminals, servers, distributed computing systems, handheld devices, or any other computing system or device. In its most basic configuration, computing system 2310 may include at least one processor 2314 and a system memory 2316.

Processor 2314 generally represents any type or form of processing unit capable of processing data or interpreting and executing instructions. In certain embodiments, processor 2314 may receive instructions from a software application or module. These instructions may cause processor 2314 to perform the functions of one or more of the exemplary embodiments described and/or illustrated herein.

System memory 2316 generally represents any type or form of volatile or non-volatile storage device or medium capable of storing data and/or other computer-readable instructions. Examples of system memory 2316 include, without limitation, Random Access Memory (RAM), Read Only Memory (ROM), flash memory, or any other suitable memory device. Although not required, in certain embodiments computing system 2310 may include both a volatile memory unit (such as, for example, system memory 2316) and a non-volatile storage device (such as, for example, primary storage device 2332, as described in detail below). In one example, one or more of modules 102 from FIG. 1 may be loaded into system memory 2316.

In certain embodiments, exemplary computing system 2310 may also include one or more components or elements in addition to processor 2314 and system memory 2316. For example, as illustrated in FIG. 23, computing system 2310 may include a memory controller 2318, an Input/Output (I/O) controller 2320, and a communication interface 2322, each of which may be interconnected via a communication infrastructure 2312. Communication infrastructure 2312 generally represents any type or form of infrastructure capable of facilitating communication between one or more components of a computing device. Examples of communication infrastructure 2312 include, without limitation, a communication bus (such as an Industry Standard Architecture (ISA), Peripheral Component Interconnect (PCI), PCI Express (PCIe), or similar bus) and a network.

Memory controller 2318 generally represents any type or form of device capable of handling memory or data or controlling communication between one or more components of computing system 2310. For example, in certain embodiments memory controller 2318 may control communication between processor 2314, system memory 2316, and I/O controller 2320 via communication infrastructure 2312.

I/O controller 2320 generally represents any type or form of module capable of coordinating and/or controlling the input and output functions of a computing device. For example, in certain embodiments I/O controller 2320 may control or facilitate transfer of data between one or more elements of computing system 2310, such as processor 2314, system memory 2316, communication interface 2322, display adapter 2326, input interface 2330, and storage interface 2334.

Communication interface 2322 broadly represents any type or form of communication device or adapter capable of facilitating communication between exemplary computing system 2310 and one or more additional devices. For example, in certain embodiments communication interface 2322 may facilitate communication between computing system 2310 and a private or public network including additional computing systems. Examples of communication interface 2322 include, without limitation, a wired network interface (such as a network interface card), a wireless network interface (such as a wireless network interface card), a modem, and any other suitable interface. In at least one embodiment, communication interface 2322 may provide a direct connection to a remote server via a direct link to a network, such as the Internet. Communication interface 2322 may also indirectly provide such a connection through, for example, a local area network (such as an Ethernet network), a personal area network, a telephone or cable network, a cellular telephone connection, a satellite data connection, or any other suitable connection.

In certain embodiments, communication interface 2322 may also represent a host adapter configured to facilitate communication between computing system 2310 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 2322 may also allow computing system 2310 to engage in distributed or remote computing. For example, communication interface 2322 may receive instructions from a remote device or send instructions to a remote device for execution.

As illustrated in FIG. 23, computing system 2310 may also include at least one display device 2324 coupled to communication infrastructure 2312 via a display adapter 2326. Display device 2324 generally represents any type or form of device capable of visually displaying information forwarded by display adapter 2326. Similarly, display adapter 2326 generally represents any type or form of device configured to forward graphics, text, and other data from communication infrastructure 2312 (or from a frame buffer, as known in the art) for display on display device 2324.

As illustrated in FIG. 23, exemplary computing system 2310 may also include at least one input device 2328 coupled to communication infrastructure 2312 via an input interface 2330. Input device 2328 generally represents any type or form of input device capable of providing input, either computer or human generated, to exemplary computing system 2310. Examples of input device 2328 include, without limitation, a keyboard, a pointing device, a speech recognition device, or any other input device.

As illustrated in FIG. 23, exemplary computing system 2310 may also include a primary storage device 2332 and a backup storage device 2333 coupled to communication infrastructure 2312 via a storage interface 2334. Storage devices 2332 and 2333 generally represent any type or form of storage device or medium capable of storing data and/or other computer-readable instructions. For example, storage devices 2332 and 2333 may be a magnetic disk drive (e.g., a so-called hard drive), a solid state drive, a floppy disk drive, a magnetic tape drive, an optical disk drive, a flash drive, or the like. Storage interface 2334 generally represents any type or form of interface or device for transferring data between storage devices 2332 and 2333 and other components of computing system 2310.

In certain embodiments, storage devices 2332 and 2333 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 2332 and 2333 may also include other similar structures or devices for allowing computer software, data, or other computer-readable instructions to be loaded into computing system 2310. For example, storage devices 2332 and 2333 may be configured to read and write software, data, or other computer-readable information. Storage devices 2332 and 2333 may also be a part of computing system 2310 or may be a separate device accessed through other interface systems.

Many other devices or subsystems may be connected to computing system 2310. Conversely, all of the components and devices illustrated in FIG. 23 need not be present to practice the embodiments described and/or illustrated herein. The devices and subsystems referenced above may also be interconnected in different ways from that shown in FIG. 23. Computing system 2310 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 2310. All or a portion of the computer program stored on the computer-readable-storage medium may then be stored in system memory 2316 and/or various portions of storage devices 2332 and 2333. When executed by processor 2314, a computer program loaded into computing system 2310 may cause processor 2314 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 2310 may be configured as an Application Specific Integrated Circuit (ASIC) adapted to implement one or more of the exemplary embodiments disclosed herein.

Figure 24:
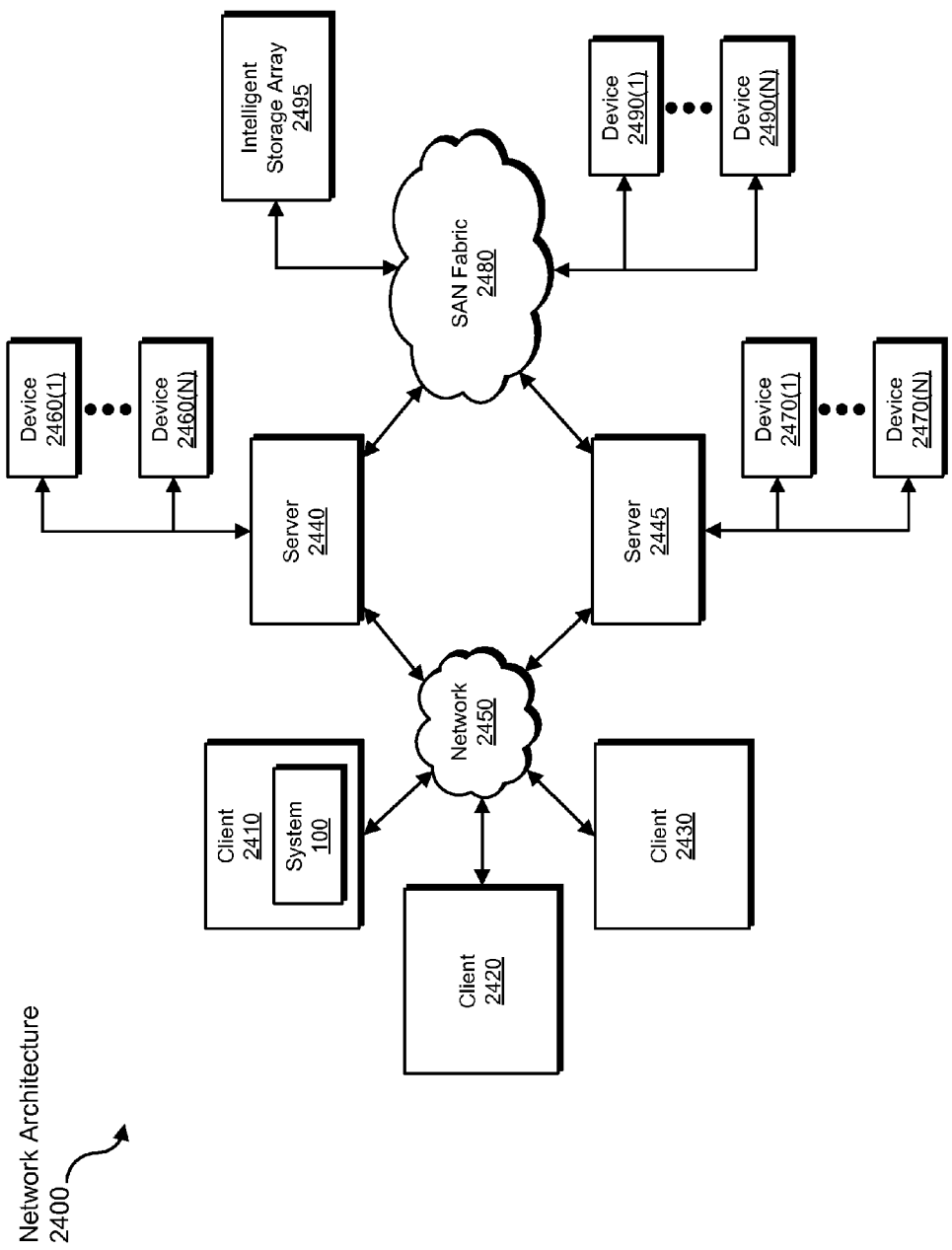
FIG. 24 is a block diagram of an exemplary computing network capable of implementing one or more of the embodiments described and/or illustrated herein.

FIG. 24 is a block diagram of an exemplary network architecture 2400 in which client systems 2410, 2420, and 2430 and servers 2440 and 2445 may be coupled to a network 2450. As detailed above, all or a portion of network architecture 2400 may perform and/or be a means for performing, either alone or in combination with other elements, one or more of the identifying, receiving, committing, marking, flushing, caching, implementing, writing, replicating, sending, relaying, determining, creating steps disclosed herein. All or a portion of network architecture 2400 may also be used to perform and/or be a means for performing other steps and features set forth in the instant disclosure.

Client systems 2410, 2420, and 2430 generally represent any type or form of computing device or system, such as exemplary computing system 2310 in FIG. 23. Similarly, servers 2440 and 2445 generally represent computing devices or systems, such as application servers or database servers, configured to provide various database services and/or run certain software applications. Network 2450 generally represents any telecommunication or computer network including, for example, an intranet, a WAN, a LAN, a PAN, or the Internet. In one example, client systems 2410, 2420, and/or 2430 and/or servers 2440 and/or 2445 may include all or a portion of system 100 from FIG. 1.

As illustrated in FIG. 24, one or more storage devices 2460(1)-(N) may be directly attached to server 2440. Similarly, one or more storage devices 2470(1)-(N) may be directly attached to server 2445. Storage devices 2460(1)-(N) and storage devices 2470(1)-(N) generally represent any type or form of storage device or medium capable of storing data and/or other computer-readable instructions. In certain embodiments, storage devices 2460(1)-(N) and storage devices 2470(1)-(N) may represent Network-Attached Storage (NAS) devices configured to communicate with servers 2440 and 2445 using various protocols, such as Network File System (NFS), Server Message Block (SMB), or Common Internet File System (CIFS).

Servers 2440 and 2445 may also be connected to a Storage Area Network (SAN) fabric 2480. SAN fabric 2480 generally represents any type or form of computer network or architecture capable of facilitating communication between a plurality of storage devices. SAN fabric 2480 may facilitate communication between servers 2440 and 2445 and a plurality of storage devices 2490(1)-(N) and/or an intelligent storage array 2495. SAN fabric 2480 may also facilitate, via network 2450 and servers 2440 and 2445, communication between client systems 2410, 2420, and 2430 and storage devices 2490(1)-(N) and/or intelligent storage array 2495 in such a manner that devices 2490(1)-(N) and array 2495 appear as locally attached devices to client systems 2410, 2420, and 2430. As with storage devices 2460(1)-(N) and storage devices 2470(1)-(N), storage devices 2490(1)-(N) and intelligent storage array 2495 generally represent any type or form of storage device or medium capable of storing data and/or other computer-readable instructions.

In certain embodiments, and with reference to exemplary computing system 2310 of FIG. 23, a communication interface, such as communication interface 2322 in FIG. 23, may be used to provide connectivity between each client system 2410, 2420, and 2430 and network 2450. Client systems 2410, 2420, and 2430 may be able to access information on server 2440 or 2445 using, for example, a web browser or other client software. Such software may allow client systems 2410, 2420, and 2430 to access data hosted by server 2440, server 2445, storage devices 2460(1)-(N), storage devices 2470(1)-(N), storage devices 2490(1)-(N), or intelligent storage array 2495. Although FIG. 24 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 2440, server 2445, storage devices 2460(1)-(N), storage devices 2470(1)-(N), storage devices 2490(1)-(N), intelligent storage array 2495, or any combination thereof. All or a portion of one or more of the exemplary embodiments disclosed herein may also be encoded as a computer program, stored in server 2440, run by server 2445, and distributed to client systems 2410, 2420, and 2430 over network 2450.

As detailed above, computing system 2310 and/or one or more components of network architecture 2400 may perform and/or be a means for performing, either alone or in combination with other elements, one or more steps of an exemplary method for enabling write-back caching and replication at different abstraction layers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may identify point-in-time inconsistent data to be transformed (e.g., data stored within a backing store that has been made, by a cache abstraction layer, point-in-time inconsistent), transform the point-in-time inconsistent data into point-in-time consistent data (e.g., by flushing, to the backing store, writes destined for the backing store that have been cached by the cache abstraction layer), output a result of the transformation to a secondary storage system (e.g., by replicating the backing store to a secondary storage system), use the result of the transformation to create a point-in-time image of the backing store at the secondary storage system, and store the result of the transformation to the secondary storage system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for enabling write-back caching and replication at different abstraction layers, at least a portion of the method being performed by a computing device comprising at least one processor, the method comprising:
   identifying a cache abstraction layer that implements write-back caching to selectively store in a cache at least one write from an application to a backing store, wherein the cache abstraction layer is not a part of the application;
   identifying a replication abstraction layer that replicates the backing store to a secondary store at a remote secondary storage system by replicating writes committed to the backing store from the backing store to the secondary store at the remote secondary storage system, wherein:
      the cache abstraction layer is not a part of the replication abstraction layer;
      the replication abstraction layer is not a part of the cache abstraction layer;
   receiving a request to create a point-in-time image of the backing store from data stored within the secondary store at the remote secondary storage system at a point at which the data stored within the secondary store represents a copy of the backing store wherein the writes committed to the backing store are point-in-time consistent;
   committing, in response to the request, the write from the cache to the backing store to ensure that the writes committed to the backing store are point-in-time consistent;
   marking, upon committing the write from the cache to the backing store, the point at which the writes committed to the backing store are point-in-time consistent so that, after the replication abstraction layer replicates the write to the secondary store at the remote secondary storage system, the point at which the data stored within the secondary store represents the copy of the backing store wherein the writes committed to the backing store are point-in-time consistent can be determined at the remote secondary storage system and the point-in-time image of the backing store can be created from the data stored within the secondary store, wherein the steps of committing the write and marking the point at which the writes committed to the backing store are point-in-time consistent are performed by the cache abstraction layer.

2. The method of claim 1, wherein committing the write from the cache to the backing store comprises:
   flushing the write from the cache to the backing store;
   caching, while the write is flushed from the cache to the backing store, subsequent writes to the backing store at the cache abstraction layer, wherein the subsequent writes are not committed to the backing store until the write is flushed to the backing store.

3. The method of claim 1, wherein committing the write to the backing store comprises:
   flushing the write from the cache to the backing store;
   implementing, while the write is flushed from the cache to the backing store, write-through caching at the cache abstraction layer to cache subsequent writes to the backing store.

4. The method of claim 1, wherein:
   marking the point at which the writes committed to the backing store are point-in-time consistent comprises writing a marker to the backing store at the point at which the writes committed to the backing store are point-in-time consistent;

the replication abstraction layer is configured to:
replicate the marker from the backing store to the secondary store at the remote secondary storage system;
interpret, at the remote secondary storage system, the replicated marker as an indication of the point at which the data stored within the secondary store represents the copy of the backing store wherein the writes committed to the backing store are point-in-time consistent.

5. The method of claim 1, wherein marking the point at which the writes committed to the backing store are point-in-time consistent comprises:
sending a message to the replication abstraction layer that indicates that the writes committed to the backing store are point-in-time consistent;
relaying, via the replication abstraction layer, the message to the remote secondary storage system.

6. The method of claim 1, further comprising:
determining, at the remote secondary storage system, the point at which the data stored within the secondary store represents the copy of the backing store wherein the writes committed to the backing store are point-in-time consistent;
creating, based on the determination, the point-in-time image of the backing store from the data stored within the secondary store.

7. The method of claim 1, wherein:
the cache abstraction layer comprises a volume manager;
the replication abstraction layer comprises an intelligent storage array.

8. The method of claim 1, wherein:
the cache abstraction layer comprises a file system manager;
the replication abstraction layer comprises an intelligent storage array.

9. The method of claim 1, wherein:
the cache abstraction layer comprises a file system manager;
the replication abstraction layer comprises a volume manager.

10. A system for enabling write-back caching and replication at different abstraction layers, the system comprising:
an identification module programmed to:
identify a cache abstraction layer that implements write-back caching to selectively store in a cache at least one write from an application to a backing store, wherein the cache abstraction layer is not a part of the application;
identify a replication abstraction layer that replicates the backing store to a secondary store at a remote secondary storage system by replicating writes committed to the backing store from the backing store to the secondary store at the remote secondary storage system, wherein:
the cache abstraction layer is not a part of the replication abstraction layer;
the replication abstraction layer is not a part of the cache abstraction layer;
a receiving module programmed to receive a request to create a point-in-time image of the backing store from data stored within the secondary store at the remote secondary storage system at a point at which the data stored within the secondary store represents a copy of the backing store wherein the writes committed to the backing store are point-in-time consistent;
a committing module programmed to commit, in response to the request, the write from the cache to the backing store to ensure that the writes committed to the backing store are point-in-time consistent;
a marking module programmed to mark, upon committing the write from the cache to the backing store, the point at which the writes committed to the backing store are point-in-time consistent so that, after the replication abstraction layer replicates the write to the secondary store at the remote secondary storage system, the point at which the data stored within the secondary store represents the copy of the backing store wherein the writes committed to the backing store are point-in-time consistent can be determined at the remote secondary storage system and the point-in-time image of the backing store can be created from the data stored within the secondary store;
at least one processor configured to execute the identification module, the receiving module, the committing module, and the marking module, wherein the committing module and the marking module are part of the cache abstraction layer.

11. The system of claim 10, wherein the committing module is programmed to commit the write to the backing store by:
flushing the write from the cache to the backing store;
caching, while the write is flushed from the cache to the backing store, subsequent writes to the backing store at the cache abstraction layer, wherein the subsequent writes are not committed to the backing store until the write is flushed to the backing store.

12. The system of claim 10, wherein the committing module is programmed to commit the write to the backing store by:
flushing the write from the cache to the backing store;
implementing, while the write is flushed from the cache to the backing store, write-through caching at the cache abstraction layer to cache subsequent writes to the backing store.

13. The system of claim 10, wherein:
the marking module is programmed to mark the point at which the writes committed to the backing store are point-in-time consistent by writing a marker to the backing store at the point at which the writes committed to the backing store are point-in-time consistent;
the replication abstraction layer is configured to:
replicate the marker from the backing store to the secondary store at the remote secondary storage system;
interpret, at the remote secondary storage system, the replicated marker as an indication of the point at which the data stored within the secondary store represents the copy of the backing store wherein the writes committed to the backing store are point-in-time consistent.

14. The system of claim 10, wherein the marking module is programmed to mark the point at which the writes committed to the backing store are point-in-time consistent by:
sending a message to the replication abstraction layer that indicates that the writes committed to the backing store are point-in-time consistent;
relaying, via the replication abstraction layer, the message to the remote secondary storage system.

15. The system of claim 10, further comprising a backup module programmed to:
determine, at the remote secondary storage system, the point at which the data stored within the secondary store represents the copy of the backing store wherein the writes committed to the backing store are point-in-time consistent;

create, based on the determination, the point-in-time image of the backing store from the data stored within the secondary store.

16. The system of claim 10, wherein:
the cache abstraction layer comprises a volume manager;
the replication abstraction layer comprises an intelligent storage array.

17. The system of claim 10, wherein:
the cache abstraction layer comprises a file system manager;
the replication abstraction layer comprises an intelligent storage array.

18. The system of claim 10, wherein:
the cache abstraction layer comprises a file system manager;
the replication abstraction layer comprises a volume manager.

19. A non-transitory computer-readable medium comprising one or more computer-executable instructions that, when executed by at least one processor of a computing device, cause the computing device to:
identify a cache abstraction layer that implements write-back caching to selectively store in a cache at least one write from an application to a backing store, wherein the cache abstraction layer is not a part of the application;
identify a replication abstraction layer that replicates the backing store to a secondary store at a remote secondary storage system by replicating writes committed to the backing store from the backing store to the secondary store at the remote secondary storage system, wherein:
the cache abstraction layer is not a part of the replication abstraction layer;
the replication abstraction layer is not a part of the cache abstraction layer;
receive a request to create a point-in-time image of the backing store from data stored within the secondary store at the remote secondary storage system at a point at which the data stored within the secondary store represents a copy of the backing store wherein the writes committed to the backing store are point-in-time consistent;
commit, in response to the request, the write from the cache to the backing store to ensure that the writes committed to the backing store are point-in-time consistent;
mark, upon committing the write from the cache to the backing store, the point at which the writes committed to the backing store are point-in-time consistent so that, after the replication abstraction layer replicates the write to the secondary store at the remote secondary storage system, the point at which the data stored within the secondary store represents the copy of the backing store wherein the writes committed to the backing store are point-in-time consistent can be determined at the remote secondary storage system and the point-in-time image of the backing store can be created from the data stored within the secondary store, wherein the steps of committing the write and marking the point at which the writes committed to the backing store are point-in-time consistent are performed by the cache abstraction layer.

20. The non-transitory computer-readable medium of claim 19, wherein the one or more computer-executable instructions cause the computing device to commit the write to the backing store by:
flushing the write from the cache to the backing store;
caching, while the write is flushed from the cache to the backing store, subsequent writes to the backing store at the cache abstraction layer, wherein the subsequent writes are not committed to the backing store until the write is flushed to the backing store.

* * * * *